US012608716B2

(12) United States Patent
Wagner

(10) Patent No.: US 12,608,716 B2
(45) Date of Patent: Apr. 21, 2026

(54) OWNERSHIP RESTRICTED ELECTRONIC TICKETING SYSTEM

(71) Applicant: Vivid Seats, LLC, Chicago, IL (US)

(72) Inventor: Jonathan M. Wagner, Audubon, PA (US)

(73) Assignee: Vivid Seats LLC, Chicago, IL (US)

( * ) Notice: Subject to any disclaimer, the term of this patent is extended or adjusted under 35 U.S.C. 154(b) by 189 days.

(21) Appl. No.: 17/532,781

(22) Filed: Nov. 22, 2021

(65) Prior Publication Data

US 2023/0162202 A1      May 25, 2023

(51) Int. Cl.
G06Q 30/018      (2023.01)
G06Q 20/36      (2012.01)

(52) U.S. Cl.
CPC ....... G06Q 30/018 (2013.01); G06Q 20/3678 (2013.01)

(58) Field of Classification Search
CPC .. G06Q 30/018; G06Q 20/3678; G06Q 20/02; G06Q 20/065; G06Q 20/405; G06Q 20/045; G06Q 30/0601
See application file for complete search history.

(56) References Cited

U.S. PATENT DOCUMENTS

| | | | |
|---|---|---|---|
| 7,143,290 B1 | 11/2006 | Ginter et al. | |
| 7,216,109 B1* | 5/2007 | Donner | G06Q 20/382 235/382 |
| 8,571,949 B1 | 10/2013 | Boesjes | |
| 9,530,129 B2 | 12/2016 | Lanc | |
| 10,373,138 B2 | 8/2019 | Hammad | |
| 10,540,653 B1 | 1/2020 | James et al. | |

(Continued)

FOREIGN PATENT DOCUMENTS

| | | |
|---|---|---|
| WO | 2021054989 A1 | 3/2021 |
| WO | 2021222398 A1 | 11/2021 |

OTHER PUBLICATIONS

Tackmann, B. (2017). Secure event tickets on a blockchain. In Data Privacy Management, Cryptocurrencies and Blockchain Technology: ESORICS 2017 International Workshops, DPM 2017 and CBT 2017, Oslo, Norway, Sep. 14-15, 2017, Proceedings (pp. 437-444). Springer International Publishing. (Year: 2017).*

(Continued)

*Primary Examiner* — John S. Wasaff
(74) *Attorney, Agent, or Firm* — Calyx Law LLP; Frank L. Gerratana

(57)      ABSTRACT

Systems and methods for receiving an indication authorized by a first entity to transfer ownership rights in a token to a second entity are provided. The indication comprises a set of verifiable qualifications associated with the second entity, the token comprising a record of a first value associated with the token, a record of at least a set of restrictions associated with the token, and a reference to an executable program. In response to execution of the executable program, committing to one or more records of an electronic ledger in the electronic ledger platform at least one of: the transfer of the token to the second entity in exchange for currency corresponding to the first value, in response to determining that the second entity is qualified for the ownership of the token based on an evaluation of the set of verifiable qualifications and the set of restrictions.

4 Claims, 7 Drawing Sheets

(56) References Cited

U.S. PATENT DOCUMENTS

| | | | |
|---|---|---|---|
| 10,855,475 | B1 | 12/2020 | Leach et al. |
| 11,308,487 | B1 | 4/2022 | Foster et al. |
| 11,367,071 | B2 | 6/2022 | Gonzales et al. |
| 11,769,154 | B1 | 9/2023 | Cash et al. |
| 12,105,701 | B2 | 10/2024 | Wagner |
| 2003/0069827 | A1* | 4/2003 | Gathman ............... G06Q 10/02 705/37 |
| 2005/0021450 | A1* | 1/2005 | Nakfoor ............. G06Q 30/0611 705/37 |
| 2014/0100896 | A1* | 4/2014 | Du ......................... G06Q 10/02 705/5 |
| 2014/0279615 | A1* | 9/2014 | Levin ................. G06Q 30/0185 705/318 |
| 2019/0057362 | A1* | 2/2019 | Wright ................ G06F 16/1834 |
| 2019/0066063 | A1 | 2/2019 | Jessamine |
| 2019/0156363 | A1 | 5/2019 | Postrel |
| 2019/0188653 | A1* | 6/2019 | Khaund ................ H04W 12/08 |
| 2019/0205881 | A1* | 7/2019 | Borzilleri ............. G06Q 30/018 |
| 2019/0213652 | A1 | 7/2019 | Sharma et al. |
| 2019/0303892 | A1 | 10/2019 | Yantis et al. |
| 2019/0303920 | A1* | 10/2019 | Balaraman .......... H04L 67/1042 |
| 2019/0340607 | A1* | 11/2019 | Lynn ................... G06Q 20/4014 |
| 2020/0013048 | A1* | 1/2020 | Love ..................... G06Q 20/401 |
| 2020/0042989 | A1* | 2/2020 | Ramadoss ............ G06Q 50/167 |
| 2020/0065763 | A1* | 2/2020 | Rosinzonsky ........ H04L 63/123 |
| 2020/0065899 | A1 | 2/2020 | Fritsch et al. |
| 2020/0104836 | A1* | 4/2020 | Coburn .................. G06Q 20/36 |
| 2020/0250661 | A1 | 8/2020 | Padmanabhan et al. |
| 2020/0320488 | A1* | 10/2020 | Feng ..................... H04L 9/0637 |
| 2020/0327569 | A1 | 10/2020 | Feng et al. |
| 2020/0351093 | A1 | 11/2020 | Madhuram et al. |
| 2020/0351657 | A1 | 11/2020 | Wentz |
| 2020/0358784 | A1 | 11/2020 | Khaund |
| 2020/0380825 | A1* | 12/2020 | Purohit .............. G07F 17/3251 |
| 2020/0394176 | A1 | 12/2020 | Wu et al. |
| 2021/0133700 | A1* | 5/2021 | Williams .............. H04L 9/3239 |
| 2021/0158335 | A1 | 5/2021 | Bollen et al. |
| 2021/0233200 | A1 | 7/2021 | Meltzer et al. |
| 2021/0248214 | A1 | 8/2021 | Goldston et al. |
| 2021/0279305 | A1 | 9/2021 | Goldston et al. |
| 2021/0357893 | A1* | 11/2021 | Kang ................. G06Q 20/1235 |
| 2022/0118365 | A1 | 4/2022 | Thacker et al. |
| 2022/0156725 | A1* | 5/2022 | Iwama ............... G06Q 20/3676 |
| 2022/0156727 | A1* | 5/2022 | Yan ......................... G06Q 20/02 |
| 2022/0198418 | A1 | 6/2022 | Kang et al. |
| 2022/0253836 | A1* | 8/2022 | Russell ................ G06Q 20/389 |
| 2022/0277234 | A1 | 9/2022 | Uhr et al. |
| 2022/0277301 | A1 | 9/2022 | Gonzales et al. |
| 2023/0068301 | A1* | 3/2023 | Le Callonnec ........... H04L 9/50 |
| 2023/0080808 | A1* | 3/2023 | Padmanabhan ...... G06Q 20/065 705/64 |
| 2023/0080927 | A1* | 3/2023 | Padmanabhan ...... G06Q 20/381 705/64 |
| 2023/0092200 | A1 | 3/2023 | Wagner |
| 2023/0116613 | A1* | 4/2023 | Wagner ................ G06Q 20/065 705/39 |
| 2023/0120534 | A1* | 4/2023 | Jakobsson .......... G06Q 20/3827 705/39 |
| 2023/0177167 | A1 | 6/2023 | Chan et al. |
| 2024/0127201 | A1 | 4/2024 | Wagner |
| 2024/0273529 | A1 | 8/2024 | Wagner |
| 2024/0428146 | A1 | 12/2024 | Wagner |

OTHER PUBLICATIONS

Regner, F., Urbach, N., & Schweizer, A. (2019). NFTs in practice-non-fungible tokens as core component of a blockchain-based event ticketing application. (Year: 2019).*

Balbo, S., Boella, G., Busacchi, P., Cordero, A., De Carne, L., Di Caro, D., . . . & Schifanella, C. (Aug. 2002). CommonsHood: A Blockchain-based wallet app for local communities. In 2020 IEEE International Conference on Decentralized Applications and Infra-structures (DAPPS) (pp. 139-144). IEEE. (Year: 2020).*

Corsi, P., Lagorio, G., & Ribaudo, M. (Apr. 2019). TickEth, a ticketing system built on Ethereum. In Proceedings of the 34th ACM/SIGAPP Symposium on Applied Computing (pp. 409-416). (Year: 2019).*

European Search Report issued in European Application No. 23203808. 3, mailed on Mar. 11, 2024, 8 pages.

Cha et al. (2018) "A Blockchain-Based Privacy Preserving Ticketing Service", IEEE Global Conference on Consumer Electronics (GCCE), 585-587.

Le et al. (2019) "Implementation of a Blockchain-Based Event Reselling System", 6th International Conference on Computational Science/Intelligence and Applied Informatics (CSII), 50-55.

Lin et al. (Oct. 15, 2019) "A Smart Contract-Based Mobile Ticketing System with Multi-Signature and blockchain", IEEE Global Conference on Consumer Electronics (GCCE), 231-232.

Marksteiner, Stefan (Jul. 2018) "Smart Ticket Protection: An Architecture for Cyber-Protecting Physical Tickets Using Digitally Signed Random Pattern Markers", IEEE Conference on Commerce and Enterprise Computing, 5 Pages.

* cited by examiner

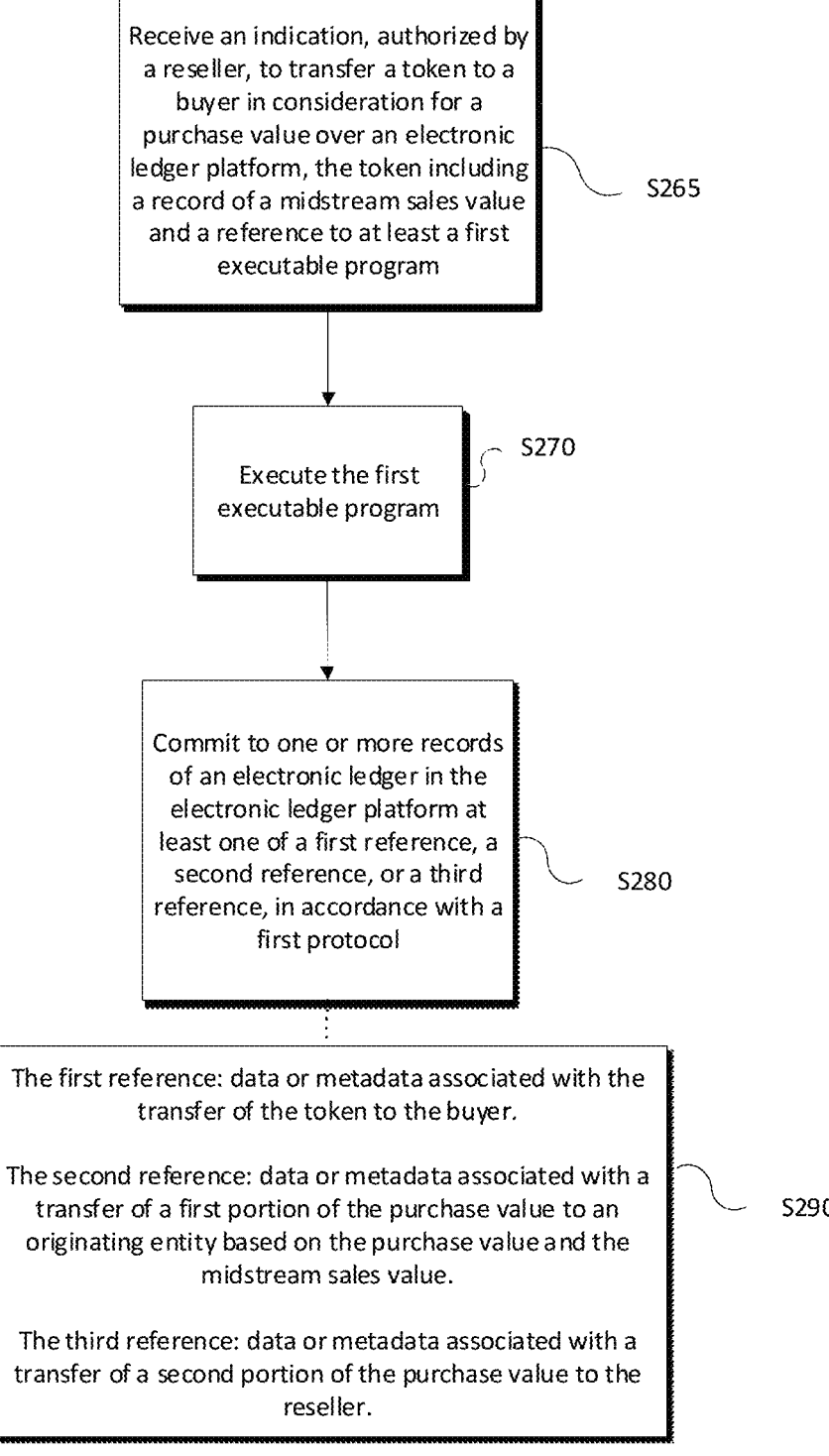

Receive an indication, authorized by a reseller, to transfer a token to a buyer in consideration for a purchase value over an electronic ledger platform, the token including a record of a midstream sales value and a reference to at least a first executable program

S265

Execute the first executable program

S270

Commit to one or more records of an electronic ledger in the electronic ledger platform at least one of a first reference, a second reference, or a third reference, in accordance with a first protocol

S280

The first reference: data or metadata associated with the transfer of the token to the buyer.

The second reference: data or metadata associated with a transfer of a first portion of the purchase value to an originating entity based on the purchase value and the midstream sales value.

The third reference: data or metadata associated with a transfer of a second portion of the purchase value to the reseller.

OWNERSHIP RESTRICTED ELECTRONIC TICKETING SYSTEM

CROSS-REFERENCE TO RELATED APPLICATIONS

This application is related to U.S. patent application Ser. Nos. 17/480,980 and 17/499,784, respectively filed on Sep. 21, 2021 and Oct. 12, 2021, the content of which is incorporated by reference herein in its entirety.

TECHNICAL FIELD

The disclosed subject matter generally relates to ownership restricted electronic ticketing systems and methods.

BACKGROUND

An electronic ledger, such as a blockchain, can be used to record ownership of assets and enable entities to carry out transactions using electronic tokens associated with those assets. For example, an electronic token, which in itself can be a type of electronic asset, may be transferred among entities by issuing transactions recorded on the electronic ledger.

In many electronic ledger platforms, the originator of a transaction has limited or no control over the downstream transactions. Nor can the originator control the downstream token exchanges in a meaningful way to limit or restrict a transaction or ownership of the token depending on the identity of the downstream purchaser.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Among other things, we describe implementations of systems and methods for enabling one or more nodes of an electronic ledger platform to carry out operations with respect to one or more records of the electronic ledger platform. The operations comprise receiving an indication authorized by a first entity (e.g., a selling entity) to transfer ownership rights in a token to a second entity (e.g., a buying entity). The indication may include a set of verifiable qualifications associated with the second entity and the token may include a record of a first value associated with the token.

A set of restrictions or a reference to an executable program (e.g., a smart contract) may be associated with the token. In response to execution of the executable program, certain data or metadata is stored or committed to one or more records of an electronic ledger in the electronic ledger platform. The data or metadata may include a reference to the transfer of the token to the second entity in exchange for currency corresponding to the first value, in response to determining that the second entity is qualified for the ownership of the token based on an evaluation of the set of verifiable qualifications and the set of restrictions. In this example, a first amount of currency corresponding to the first value is transferred to the first entity.

In some aspects, in response to determining that the second entity is not qualified for the ownership of the token based on the evaluation of the set of verifiable qualifications and the set of restrictions, the data or metadata references the transfer of the token to the second entity in exchange for currency corresponding to a second value higher than the first value. In this example, a second amount of currency corresponding to a first portion of the second value is transferred to the first entity and a third amount of currency corresponding to a second portion of the second value is transferred to a third entity (e.g., issuing entity).

In certain aspects, the data or metadata provides an indication that the transfer of the token was unsuccessful, in response to determining that the second entity is not qualified for the ownership of the token based on the evaluation of the set of verifiable qualifications and the set of restrictions. In this example, the executable program may fail to write a record of the subject transaction to the electronic ledger. The rejection of the transaction may contain an error code that is recorded on the electronic ledger to indicate the failure of transfer of the token due to restrictions attached to or associated with the token at the time of issuance or a later time. The restrictions can include limitations on ownership, privileges, or the transfer price for a ticket offered for sale.

An electronic token for a ticket may be initially issued for sale with metadata embedded in or otherwise associated with the token. The metadata can be evaluated by a smart contract, for example, to determine whether certain restrictions are associated with the token. The restrictions may indicate, for example, that the issued token is non-transferable, or that it is transferable only to a certain group of purchasers. The restrictions can also be used to set the sales price for a ticket based on the identity of the purchaser.

In an example implementation, a restriction attached to a token indicates that, if the token is transferred to an unqualified purchaser, the sales price for the ticket will be at a higher sales price. If the token is transferred to an unqualified purchaser, then a smart contract executing the transfer may either block the transfer, restrict the transfer, or modify the sales price. The transfer in such a scenario may result in a portion of the sales price paid by the unqualified purchaser to be transferred to an original issuer of the token (or other seller in the upstream chain of commerce).

One or more nodes of an electronic ledger platform may be configured to carry out operations with respect to one or more records of the electronic ledger platform, where the operations comprise receiving an indication authorized by a first entity to transfer ownership rights in a token to a second entity, the indication comprising a set of verifiable qualifications associated with the second entity, the token comprising a record of at least a first value associated with the token, a record of at least a set of restrictions associated with the token, and a reference to an executable program.

In response to determining that the second entity is not qualified for the ownership of the token (e.g., based on the evaluation of the set of verifiable qualifications and the set of restrictions), either nothing is committed to the one or more records of an electronic ledger, or an indication or error code is committed that indicates the transfer of the token was unsuccessful. Other implementations are also possible, depending on the nature and programming configurations of the blockchain or smart contracts being utilized.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

FIGS. 2A and 2B are flow diagrams illustrating example processes for controlling downstream token transactions in an electronic ledger, in accordance with one or more embodiments.

Figure 1A:
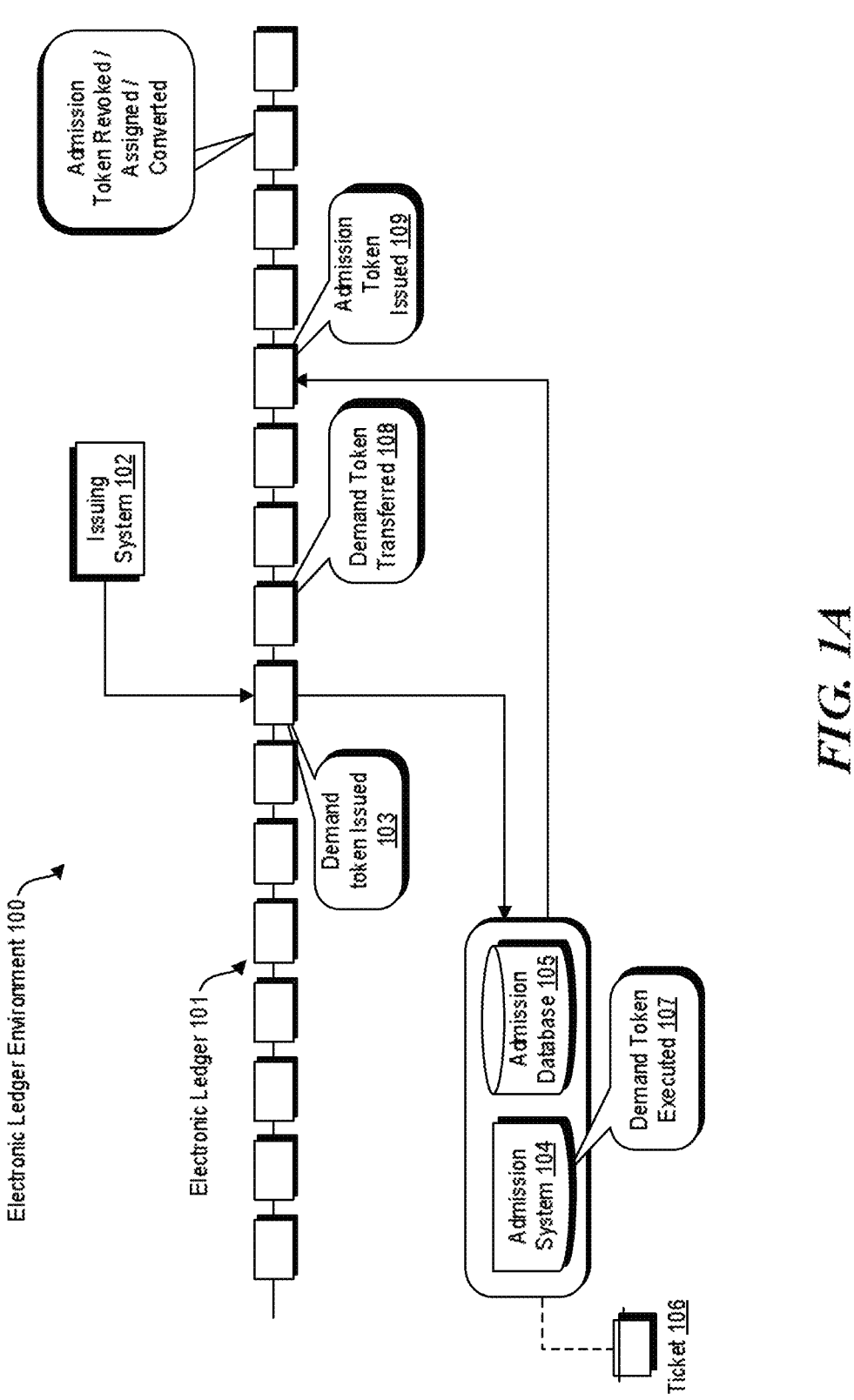
FIG. 1A illustrates an example electronic ledger environment, in accordance with one or more embodiments, wherein an electronic ledger in communication with an issuing system and an admission system may be utilized to manage electronic token sales.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

Typically, a primary ticketing agency is chosen by an event producer or a content rights holder to manage ticket sales. After the initial sale, attendance rights held in the form of physical or digital tickets can generally be freely gifted, transferred, or sold by private or professional resellers at a secondary marketplace. Brokers and resellers (e.g., downstream resellers) often buy tickets at an initial sales price (e.g., face value) with the hope and expectation of making a profit by selling the tickets at a premium later. Usually, the downstream sales do not require the reseller to pay a commission to the event producer or the primary ticketing agency. Even if such arrangement exist, enforcing it is rather difficult or impossible. Thus, a reseller gets to keep the net proceeds from a downstream sale.

To help better understand and appreciate the novel aspects and the practical applications of the subject matter disclosed herein, we use the example of the right of admission to a venue which has traditionally been reserved by way of, for example, an individual purchasing a physical ticket and presenting it at the time of entry to the event. In certain circumstances, primary ticketing agencies aim to further participate in the monetary rewards of the downstream sales, particularly when they observe attendance prices at levels that exceed face values. The mechanisms that these agencies have available to do so are limited in their capabilities and harmful to the consumer experience in that they create friction for consumers to access the tickets in attending the event and/or constrict the supply of inventory.

Primary ticketing agencies have conventional ticketing systems that are incapable of accurately monitoring the sales price of a ticket in downstream commerce or the rightful ownership. In accordance with one or more implementations, an electronic ledger environment configured for ticketing, resale and admission rights management enables one or more entities (e.g., an originating entity or agency) to control and orchestrate functions and operations associated with the issuance, execution, pricing, commissions, transfer, assignment, or revocation of digital tokens. Different types of digital tokens (e.g., a demand token and an admission token, described below) may be implemented or instantiated to represent certain rights to buy or sell event tickets or admission to an event or venue, and also to control or determine the number of outstanding tickets that are remaining in the hands of resellers.

In some embodiments, a blockchain is used to record price and fee data in a decentralized and reliable manner, allowing sellers to transfer tickets freely, while simultaneously accounting for resale fees and commissions or other transaction data or metadata. The above operations advantageously may be performed without the direct integration of different systems and technologies used by the multiple parties involved in the transactions. This implementation results in a more robust and simple operation environment in which a mixing pool may be optionally added to obfuscate transacted business information and prevent the information from being disclosed to unauthorized parties, but ensuring that all parties ultimately trust the transactions' outcome and efficacy.

According to certain implementations, to achieve the above-noted practical outcomes and advantages, when transferring ticket tokens on a blockchain, one or more smart contracts are used to allow a primary issuer to monitor the resale price of tickets as they are sold in downstream transaction. When a transfer of a ticket token discloses a transfer price (either explicitly or conjointly with a payment ledger entry), a commission is required to be paid to a party other than the seller (e.g., to the originator, or originators agent, or some other upstream seller) based upon the transfer price and a previous transfer price (e.g., any prior transfer price or the purchase price paid by the reseller) recorded in the blockchain. Based on the above implementation, additional commissions (beyond any earlier or initial commissions) are paid on downstream transactions to upstream sellers, until it is finally sold to a consumer. This additional commission can help align the interests of the content rights holders and primary issuers with the resale parties.

A blockchain-based system may be utilized to maintain a record of issuance and exchange of an electronic token associated with an asset (e.g., an event ticket) and automatically execute a transfer of an amount of cryptocurrency to an originating entity when the token is transferred between entities in downstream exchanges. As the token is transferred between entities, the token may be exchanged for an increasingly value (e.g., a larger quantity of cryptocurrency). A subsequent transfer of the token, in certain aspects, triggers an executable program (e.g., smart contract) stored on the electronic ledger which causes a portion of the cryptocurrency paid in the transfer to be provided to an upstream seller, such as the originator or the originator's agent. The blockchain-based system also maintains a record of what is provided to the originator across transactions of the same token. As such, the amount of cryptocurrency provided to the originator in subsequent transfers of the token depends on the previous transfers. In this way, the system maintains the state and information about multiple transfers of the same token.

In accordance with one or more aspects, an electronic ledger system (e.g., a blockchain platform) is configured to control and verify ownership rights and restrictions on transfer of electronic tickets to qualified purchasers. The restrictions can include limitations on ownership, privileges, or the transfer price for an electronic token offered for sale. An electronic token is initially issued for sale with metadata embedded in or otherwise associated with the token. The metadata can be evaluated by a smart contract, for example, to determine whether certain restrictions are associated with the token. The restrictions can indicate, for example, that the issued token is non-transferable, or that it is transferable only to a certain group or class of buyers (e.g., qualified purchasers such as members of a fan club). The restrictions can also be used to set the sales price for a ticket based on the identity of the purchaser.

In one implementation, a restriction attached to a token may indicate that, if the token is transferred to an unqualified purchaser, the sales price for the ticket will be at a certain sales price (e.g., a price higher than the face value or a previous sales price). Accordingly, if the token is transferred to an unqualified purchaser (or in a manner that one or more rules, conditions, or restrictions attached to the token are violated), then a smart contract executing the transfer either (1) blocks the transfer, (2) restricts the transfer or privileges associated with the token, or (3) causes the transfer at a sales price (e.g., a premium price) that would result in a portion of the sales price paid by the unqualified purchaser to be paid to an original issuer of the token or other seller in the upstream chain of commerce.

Effectively, a smart contract assigned to monitor a token transfer, in certain embodiments, prevents the transfer of a restricted token to an unqualified purchaser, unless the restriction can be lifted by satisfying certain defined conditions or rules. For example, an unqualified purchaser may be given the option to obtain a qualified status (e.g., by subscribing to a fan club membership, or use a certain source of funds like a special credit card, etc.). Thus, advantageously, a content rights holder or original seller (or primary ticketing agency) can provide perks and privileges to identifiable groups of qualified purchasers or incentivize purchasers to become members of those groups. These privileges may include a discount on the ticket price, VIP privileges, and other accommodations which cannot be passed on to an unqualified purchaser.

To determine whether a purchaser is qualified for privileges attached to a token being transacted, a verification module or logic code (e.g., an oracle process) may be implemented to facilitate token exchanges and transactions being performed over the electronic ledger. The verification module thus acts in concert with a smart contract that is verifying a transaction, in view of identifying information available on the electronic ledger or other databases or data sources. This identifying information is used by the verification module to authenticate a purchaser so that the smart contract can validate whether privileges associated with a token can pass on to the purchaser, as provided in further detail herein.

The verification module, in one embodiment, is deployed to write assertions to one or more records or blocks on the electronic ledger. The assertion written to the blocks include at least one or more of a customer identity (e.g., wallet ID, email address), customer status (e.g., loyal fan, longtime customer, VIP, etc.), verification time for the transaction, and expiration time for completing the transaction. When processing a transaction, the smart contract uses the data in the assertions recorded on the blocks of the electronic ledger and determines whether the transaction can be authorized. If the assertions recorded on the electronic ledger fail to identify the purchasing entity as matching one or more of the above verification factors (e.g., if the identity or customer status is not a match with a parameter expected by the smart contract), then the transaction is not validated by the smart contract.

In some embodiments, the verification module communicates with the smart contract about the identity of a purchaser. After searching through one or more data sources the verification module writes assertions to one or more blocks on the electronic ledger, for example, if the verification module can authenticate the identity of the purchasing entity. Based on these assertions, the smart contract invoked to validate the transfer approves or denies the transaction using the data in the assertion written by the verification module. In alternative embodiments, an independent system (other than the smart contract or the verification module) may be used to determine the qualifications of the purchasing entity and notify the verification module to write the proper assertion to the electronic ledger.

In one or more aspects, the smart contract is implemented to invalidate a transaction, if the data in the assertion does not match the identity or classification expected for a purchaser, or if an assertion matching the purchaser is not written to the electronic ledger. For example, the token originator can be authorized to write loyalty status assertions for one or more entities to the electronic ledger. The originator may write an assertion that Customer A is enrolled in a certain loyalty program for a certain time period (e.g., Customer A has VIP status, the VIP Status is valid from Jan. 1, 2022 to Dec. 31, 2022, at a 20% discount). If a transaction is written to the electronic ledger that satisfies the asserted loyalty program status and time period for Customer A, then the transaction is approved by the smart contract and the token is transferred to Customer A at the discounted rate. Conversely, another transaction for Customer B may be rejected for the discounted rate, if no assertion records are found on the electronic ledger that would identify Customer B as enrolled in the loyalty program for an indicated dates.

Definitions

Definitions for certain terminology as applicable to one or more embodiments disclosed herein are provided below for the purpose of clarity and context but without the intention to unduly limit the scope of the claimed subject matter to any specific examples or details.

As used herein, a primary issuer is a party who first sells a particular ticket. Face value is the price paid for a ticket upon initial sale. Transfer price is the price paid for a ticket upon initial sale or a subsequent sale. Attendance price is the price paid by the party who attends the event. Resale commission is a commission paid upon resale of a ticket.

A token refers to a digital asset representing ownership or other interest rights. In this context and as provided in further detail below, a token may be transferred between parties who may have an interest in buying, selling or transferring admission rights to an event or venue. A content rights holder refers to one or more producers of an event, who initially own and control the rights to attend the event or venue. In this context, admission or admitting refers to the act of allowing one or more people to attend an event by validating their right to attend.

A demand token refers to a token representing the right to demand an asset from another party. In this context, a demand token may represent ownership rights and more particularly the right to demand a ticket, ticket token, or admission token from one or more parties or entities participating in a token exchange. An admission token, in contrast, may be a token that represents the right to attend an event. An admission token essentially would be the digital equivalent to a printed ticket. A ticket, as used herein, may refer to either a demand token or an admission token.

An admission token is a bearer instrument that allows admission to an event, a venue, and in some circumstances may also represent the right to attend or own a tangible or non-tangible asset, whether fungible or non-fungible. A demand token is a digital token representing the ownership of a ticket. A zone ticket refers to the obligation for a seller to provide a ticket to a buyer in a certain section or with certain qualities. Seat license rights refer to the rights to purchase tickets for an event.

Originator or originating entity refers to the owners or producers of an event (or media) who offer the tickets and the related tokens for sale to either (1) the public (e.g., the consumers) or (2) resellers (e.g., those who intend to resell the tickets) to the public, for example, over an electronic ledger platform or other online environment. Originating agent refers to an agent (e.g., an exclusively contracted ticket agency) of the owners or producers who offer the tickets and the related tokens for sale to the public or resellers.

The terms "upstream," "midstream," and "downstream" refer to points in time when a ticket or token is exchanged or sold. Within the context of the sale of a ticket in the stream of commerce, an upstream entity is a party who sells a ticket to a midstream entity, who in turn resells the ticket to a downstream entity. Depending on the nature of the transaction and the point in time within a designated or observed timeline, an entity may be considered to be an upstream, midstream, or downstream seller (or buyer) in relation to other entities in the exchange.

In certain embodiments, an electronic ledger is used to record a list of changes to a set of data that represent purchases of items, transfers of ownership, or any other changes in data records. A digital signature of a data record may be a cryptographic technique that allows a verifying entity to strongly trust that the data record was generated or certified by a specific party. A digital signature may be applied to individual data records or collections of records, in certain implementations.

A distributed electronic ledger as used herein refers to an electronic ledger where different parts of the ledger are stored in different systems, often but not necessarily owned by different parties. A distributed ledger may be partitioned by record, by field, or a combination of the two. A blockchain may be a transactional or distributed ledger trusted by digital signatures that certify the content and/or sequence within the ledger. Individual records may also be certified through digital signatures by other parties. Although "blockchain" and "electronic ledger" are sometimes used interchangeably in this description, a blockchain is just one type of electronic ledger, and the techniques described here can be used just as effectively with other types of electronic ledgers.

Consensus refers to a mechanism or protocol that allows multiple parties to agree on the content of a block in a blockchain or distributed ledger. Proof of Work and Proof of Stake are examples of consensus mechanisms that may be utilized in accordance with one or more embodiments to verify transactions on a blockchain.

One or more electronic ledgers may be implemented to include or interface with smart contracts in the form of computing engines. A smart contract may be an executable program with a set of business logic that governs valid entries in an electronic ledger. In some embodiments, a smart contract may be registered or distributed within a blockchain, multi-chain or any type of electronic ledger, so that participants can validate or execute steps defined in the contract.

A smart contract may be utilized to, for example, allow the performance of credible (e.g., trackable and irreversible) transactions without involving a centralized managing party. The transactions may be processed by serverless microservice engines (e.g., Lambdas or other decentralized infrastructure) on a distributed ledger platform. To enable financial transactions, in certain embodiments, tokens (e.g., personal trading units) are utilized to monetize digital transactions without the need for a centralized institution (e.g., a bank).

In some example embodiments, a smart contract is a digital promise entailing rights and duties voluntarily agreed by the parties to a contract configured to digitally facilitate, verify, or enforce the negotiation or performance of an agreement between the parties. In one embodiment, the smart contract may is implemented based on a combination of protocols with user interfaces to formalize and secure relationships over computer networks, using cryptographic and other security mechanisms.

A consistent audit trail of transactions, exchanges and activities may be maintained by way of using an electronic ledger, which may be implemented as a publicly accessible message queue with an immutable database. Examples of computing platforms that may be used to implement a distributed ledger may include a blockchain, a hashgraph, or other computing data structures implemented based on a growing list of N associated records or data blocks in a blockchain.

A data block may be logically linked to another block (e.g., a previous block) in a distributed ledger based on a cryptographic hash of the content of the other block. A data block may also include a timestamp or transaction data. Further, a data block in a distributed ledger may be implemented to be immutable (e.g., resistant to modification of the data stored within the block). The immutable nature of the data block and the acceptance of a set of rules and policies by the users (or the implementers) of the distributed ledger platform provides for high levels of confidence in the data stored and processed by the distributed ledger because a singular central entity is not solely in control.

Example Implementations

Referring to FIG. 1A, an electronic ledger environment 100 may be implemented as an immutable mechanism for ticket issuance and transaction flow management in which parties involved in issuing and executing electronic tickets may write and read data and instructions associated with one or more processes using an electronic ledger 101. The electronic ledger 101 may provide the infrastructure in which the parties that manage the ticketing process may communicate by writing to block addresses designated to the parties engaged in the process.

As shown, the example electronic ledger 101 includes a plurality of linked data blocks. The electronic ledger 101 may be communicatively connected or coupled to issuing system 102 and admission system 104 configured to respectively issue and execute one or more digital tokens, such as a demand token. A user may interact with the issuing system 102, by way of a user interface mechanism for example, to request a demand token to be issued.

The process model for the electronic ledger 101 may define parameters and constraints associated with the manner in which token data is to be utilized or manipulated. For example, in certain embodiments, the rules for managing the demand and admission tokens may provide for the following:

A demand token to be recorded on the electronic ledger 101.

The demand token to be freely transferred on the electronic ledger 101 subject to any smart contracts.

The demand token to be executed to request an admission token.

An admission token to not be transferable on the electronic ledger 101.

An admission token to be exchangeable for a demand token.

Admission tokens to be stored or redeemed either on the electronic ledger 101 or in another system (e.g., an event provider's point of sale system).

Figure 1B:
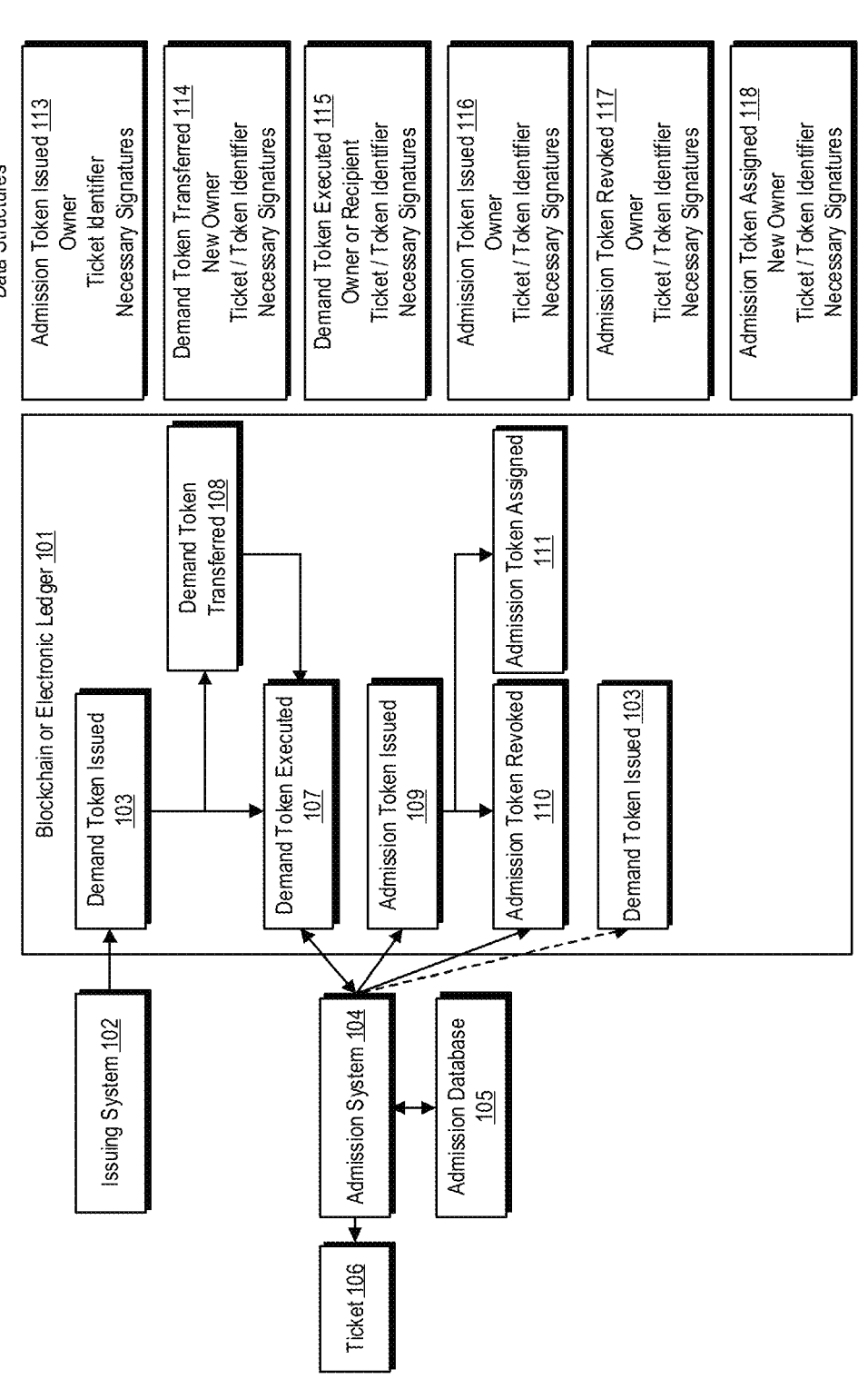
FIG. 1B illustrates an example electronic ledger environment, in accordance with one or more embodiments, where demand tokens and admission tokens may be issued, executed, assigned and revoked.

Referring to FIGS. 1A and 1B, the process for managing demand tokens and admission tokens may be implemented by enabling one or more nodes of an electronic ledger 101 to carry out operations with respect to one or more records in the electronic ledger 101. These operations, in one example, include the electronic ledger 101 receiving an indication to exchange a first token of a first type (e.g., a demand token) with a second token of a second type (e.g., an admission token). The indication received as authorized by a first entity (e.g., a seller or owner of an event ticket, an originator or an agent of the originator) allows for the exchange of the first token with the second token.

The first token, in some aspects, is associated with ownership information that indicates the first token is owned by the first entity. The first token may also include activity information (e.g., data or metadata) about a first activity, such as a concert to be held at a certain date and time and commission and pricing details. The ownership of the first token is transferable to other entities (e.g., buyers, resellers, or the general consumer public) over the electronic ledger environment 100 according to the ownership information associated with the first token as provided in further detail below.

In accordance with one or more aspects, the electronic ledger 101, in response to receiving an indication to exchange the tokens, generates the second token, which is associated with the ownership information and may also include admission information. The ownership information indicates that the second token is owned by the first entity. The admission information indicates that the second entity is to be admitted to or allowed to participate in the first activity.

Without limitation and by way of example, in some embodiments, the generation of the admission token may be committed to one or more database records of a legacy system, or records in an electronic ledger environment 100 (e.g., an electronic ledger platform), in accordance with a one or more protocols. The protocols control and memorialize the downstream exchange of the tokens and the related transactions among multiple parties and are configured to commit the tokenized transactions to at least a blockchain or an electronic ledger 101, as provided in further detail below.

Figure 2A:
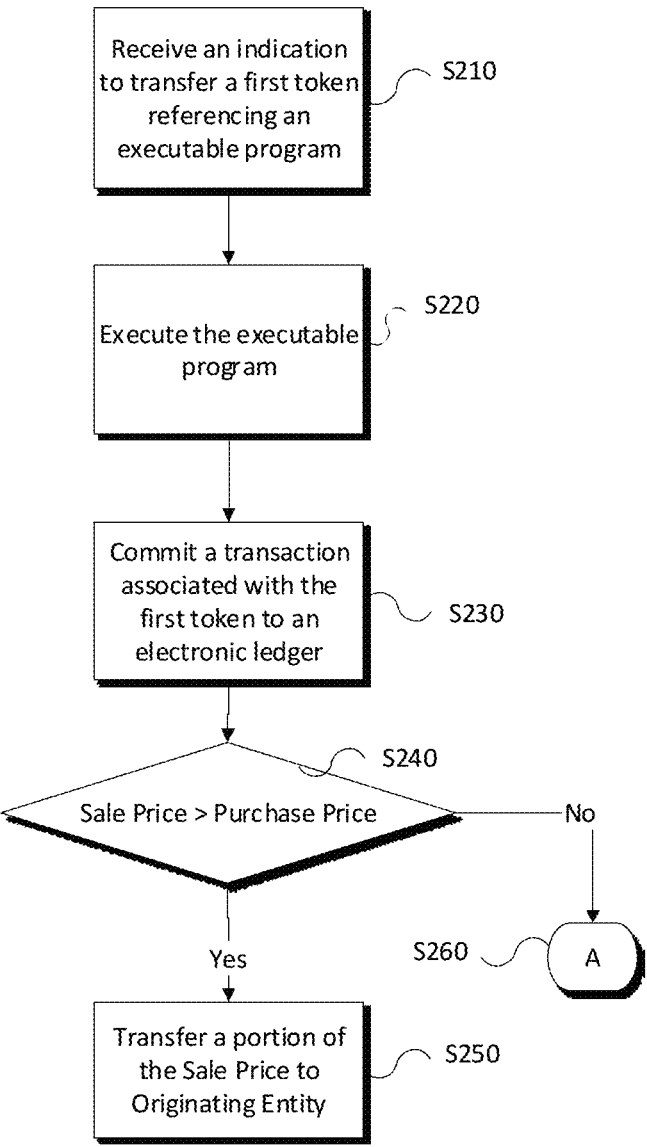

Referring to FIG. 2A, in one example embodiment, one or more nodes of an electronic ledger 101 carry out operations with respect to one or more records of the electronic ledger 101 in order to enable tokenized transactions involving the purchase and sale of intangible or tangible items (e.g., event tickets). The transactions may involve multiple parties. By way of a non-limiting example, when an originating entity, such as an event or media producer (or an agency associated with the event or media producer), desires to sell tickets for an event, the electronic ledger environment 100 may be used to track the sales of tickets from the originating entity to the downstream resellers and ultimately the consumers.

The tracking may be performed by way of recording in the electronic ledger 101 records unique identification information and metadata associated with a cryptographic token (e.g., an admission token, or a demand token) that provides the right of admission to the event. In certain embodiments, the downstream resellers automatically pay a commission on a downstream sale due to the transacted cryptographic token being associated with an executable program (e.g., a smart contract stored on the electronic ledger 101) configured to calculate a commission value to be paid to an identified upstream seller (e.g., the originating entity or an agent of the originating entity).

In one example scenario, when a transaction is initiated between a seller and a buyer, the electronic ledger 101 receives an indication authorized by the selling entity to transfer a cryptographic event token (e.g., an electronic ticket) to a buying entity. When the transaction is approved, the transaction details (e.g., ticket price, identity of the seller, identity of the buyer, unique ticket ID, etc.) may be recorded in the electronic ledger 101. As noted, in addition to the transaction details, a reference to an executable program may also be registered with the admission or demand token to calculate a commission to be paid to an upstream seller by a downstream reseller, as provided in further detail below.

Notably, when a transaction is the first transaction in the chain of transactions associated with a particular token, the selling entity is typically the originating entity. In such a transaction, the buying entity may be either a downstream reseller (e.g., an entity who intends to resell the token) or a consumer (e.g., an individual who intends to attend the event). In one example implementation, in an initial sale transaction involving the sale of a tokenized ticket over the electronic ledger 101, no commission is paid to any of the entities involved in the transaction. Therefore, an executable program associated with the token being exchanged is either not executed or, if executed, returns a null or zero value indicating no commission is to be paid.

Now referring to FIG. 2A, consider another example scenario in which the selling entity is a reseller and the buying entity is either another downstream reseller or a consumer. For the token to be transferred to the buying entity, the electronic ledger 101 receives an indication from the selling entity to transfer a token to the buying entity, where the token references an executable program (S210).

In one example embodiment, the indication references a first quantity of cryptocurrency associated with a purchase price (e.g., 0.005 BTC) paid to the selling entity by the buying entity in exchange for the token. In some examples, the token being transacted is associated with a record of a second quantity of cryptocurrency (e.g., 0.004 BTC) reflecting consideration paid to one or more other entities (e.g., upstream resellers) by the selling entity at an earlier time in exchange for the transfer of the token to the selling entity.

As a part of the processing of the token exchange between the selling entity and the buying entity, one or more nodes in the electronic ledger 101 execute an executable program (e.g., a smart contract) referenced by the token (S220). In response to the execution of the executable program, information about the transaction associated with the sold token is committed to at least one record of the electronic ledger 101 in accordance with a token transfer protocol (S230). The transaction information may include data or metadata about one or more of the following:

the transfer of the token to the buying entity, the transfer of a first portion (e.g., a commission) of the first quantity of the cryptocurrency to a third entity (e.g., the originating entity or any upstream entity involved in a prior sale of the same token), and the transfer of a second portion (e.g., net sale proceeds after commission) of the first quantity of the cryptocurrency to the selling entity.

The commission amount, depending on implementation, may be determined based on the first quantity and the second quantity of the cryptocurrency. By way of example, if the reseller sells a demand token or an admission token to a downstream buyer for 0.005 BTC (e.g., sales price or the first quantity of cryptocurrency) but had purchased the demand token or the admission token from the originating entity or an upstream seller for 0.004 BTC (e.g., purchase price or the second quantity of cryptocurrency), then a calculated commission paid to the upstream buyer may be based on a percentage of the difference between the 0.005 BTC and 0.004 BTC (e.g., x % of 0.001 BTC).

It may first be determined whether the sales price is greater than the purchase price (S240) because a reseller, at least in one example embodiment, should not have to pay a commission if the reseller broke even or incurred a loss when selling the token. If the reseller generated a profit, however, then a portion of the sales price (e.g., a commission) is paid to the originating entity or other upstream seller (S250) due to the automatic execution of the executable program or smart contract stored on the electronic ledger 101. The records of the electronic ledger 101 may be updated to indicate that a transaction did not result in a profit and, depending on implementation, the executable program may either not be executed or may return a zero or null value to indicate no commission is due (S260).

In addition to the above noted data and metadata stored and processed in the electronic ledger environment 100, in certain embodiments, a token involved in the electronic ledger transaction may further include a reference or information about a third quantity of cryptocurrency (e.g., 0.002 BTC) representing the face value of an event ticket as issued by an originating entity. In this context, the face value would be the amount of cryptocurrency paid by an upstream reseller to, for example, a originating ticket sales agency upon an initial transfer of the token from the originating entity to an upstream reseller. Depending on implementation, the face value of the ticket may be also taken into consideration as a factor in calculation of commissions by the executable program in downstream transactions.

Referring to FIG. 2B, in another example embodiment, one or more nodes of an electronic ledger 101 may be configured to carry out operations to transfer a cryptographic token between multiple entities, such as an originating entity, a reselling entity (reseller), and a buying entity (buyer), for example. An indication authorized by the reseller is received by a node in the electronic ledger 101 to transfer the token to the buyer in consideration for a purchase value (e.g., 0.005 BTC) over the electronic ledger platform (S265). The purchase value may be in any denomination of currency, including cryptocurrency, such as Bitcoin (BTC), Ethereum (ETH) or other tradable currency that can be exchanged over the electronic ledger 101.

In some aspects, the first cryptographic token includes a record of a midstream sales value (e.g., 0.004 BTC) provided by the reseller to the originating entity in consideration for transfer of the first cryptographic token to the reseller (not shown in FIG. 2B). The first cryptographic token may also include a reference to at least a first executable program. In response to the execution of the first executable program (S270), at least one of a first reference, a second reference, or a third reference are committed to one or more records of the electronic ledger 101 in accordance with a first protocol configured to verify and settle cryptocurrency transactions on the electronic ledger platform (S280, S290).

Depending on implementation, by way of example and without limitation, the first reference includes data or metadata associated with the transfer of the first cryptographic token to the buyer in exchange for the purchase value (e.g., 0.005 BTC) paid by the buyer to the reseller. The second reference includes data or metadata associated with the transfer of a first portion of the purchase value (e.g., a commission) to the originating entity, where the commission is determined based on the purchase value and the midstream sales value (e.g., a percentage of the difference between 0.005 BTC and 0.004 BTC). The third reference may include data or metadata associated with the transfer of a second portion of the purchase value (e.g., net profits) to the reseller.

In the above example, if the reseller purchased the token for 0.004 BTC from the originating entity and sold it to the buyer for a midstream sales value of 0.005 BTC, then the gross proceeds to the reseller would be the midstream sales value minus purchase value (0.005 BTC–0.004 BTC), which is 0.001 BTC. Assuming an example 10% commission rate, the commission value payable to the originating party is calculated as 0.0001 BTC with a net payment of (0.005 BTC–0.0001 BTC) 0.0049 BTC payable to the reseller.

In another example, instead of cryptocurrency other denominations of currency, such as the United States Dollar, can be used to make the transaction on the electronic ledger. For example, if the reseller purchased the token for $150 from an upstream seller and sold the token to a downstream buyer for a sales value of $200, then the profit to the reseller is the sales value minus purchase value ($200–$150), which is $50 in this example. Assuming a 10% commission rate on the profit of $50, for example, the commission value payable to an upstream seller is calculated as $5 with a final amount of ($50–$5) $45 payable to the reseller.

For a token transaction to be successful, in certain aspects, the transaction or an indication received by the electronic ledger 101 for making a payment may need to be authorized by both the selling entity and the buying entity. Furthermore, a transaction associated with the transfer of the token to the buying entity may be committed in a first record of the electronic ledger 101 and the transfer of the commission amount to a designated entity may be committed in a second record of the electronic ledger. In alternative embodiments, the transaction data may be recorded in a single record of the electronic ledger for a single transaction.

As provided in the above examples, the calculation of the commission, in certain implementations, is such that the originating entity (or an upstream seller) determines the amount of commission to be collected by the executable program for each incremental downstream transaction. For example, the commission paid may be a fixed value (e.g., $10 per transaction) regardless of the value of the token transactions, or gross profits or net profits of the reseller. Alternatively, the commission paid may be a percentage of the difference between the amount paid by a reseller in purchasing the token and the amount received by the reseller when selling the token and optionally taking into account certain other factors, such as the face value of the ticket or the general state of ticket sales.

In one or more implementations, multiple executable programs (e.g., multiple smart contracts) are associated with the same token, such that a first upstream seller receives a first commission for a downstream sale, and a second upstream seller receives a second commission from the same downstream sale. In such a scenario, a downstream seller would automatically pay from the amount collected, in exchange for the sale of a token, a first commission to the first upstream seller upon execution of the first executable program, and also pay a second commission to the second upstream seller upon the execution of the second executable program.

It is noteworthy that, in certain embodiments, one or more executable programs associated with the token being transacted are executed for every downstream transaction involving the token. In other words, an upstream seller to which a commission is due (e.g., as a result of the execution of a smart contract) will receive a commission on the incremental increase in the sales price of a ticket being sold in the downstream commerce until the final sale. Certain rules, conditions, and factors may be interjected into one or more executable programs to adjust or manipulate the amount of commission due on one or more downstream transactions.

In one example scenario, a first smart contract may be executed to govern a ticket transaction between a reseller and a consumer as well as to govern a commission transaction between the reseller and an upstream seller. In another example scenario, a second smart contract may be executed to govern the commission transaction between the reseller and an upstream seller for the same or other ticket transactions. In other words, a single or multiple smart contracts and electronic ledger records may be utilized to govern various aspects of a ticket sale or different transactions associated with a ticket sale in either upstream or downstream directions.

For example, an upstream seller may want to control or dynamically adjust the amount of commission due based on the downstream sales price, or based on the downstream profit made by a reseller prior to the payment of the commission. By way of a non-limiting example, an upstream reseller may configure the executable program to result in the collection of an X % (e.g., 5%) commission, if the downstream pre-commission profit made by a downstream reseller is under a first value (e.g., $25), and the collection of a Y % (e.g., 10%) commission, if the downstream pre-commission profit is over the first value but less than a second value (e.g., $50), and the collection of a Z % (e.g., 15%) commission, if the pre-commission profit is over the second value, and so on.

Similarly, the commission amount may be waived or set to a nominal value, if the pre-commission profit made by the downstream seller is, for example, zero or below a certain threshold value. Other possible implementations and configurations for a fair or reasonable commission calculation protocol may be enforced in various embodiments. As another example, the executable program for commission calculation may be configured to take into consideration the status of a downstream seller or buyer. For example, if the reseller or consumer falls in a certain category such as a protected class, a minority group, individuals with limited financial resources (e.g., students), or individuals of a certain age or disability, then amount of commission may be adjusted lower or waived.

Accordingly, various aspects and implementations of the claimed subject matter allow an upstream seller to have an adjustable level of control over the amount of commission paid by downstream resellers. The commission imposed may be in perpetuity or terminable after a certain number of transactions on the electronic ledger 101 or may be based on configurable factors and conditions that may be adjusted overtime as the timeline for attending or producing an event expires.

For example, the smart contracts or executable programs on the electronic ledger 101 may be configurable to reduce the amount of commission due if attendance for an event is projected to be lower than a first threshold at a first timeline (e.g., low demand), or alternatively may increase the amount of commission due if attendance to an event is projected to be higher than a second threshold at a second timeline (high demand), where the adjustments may be made incrementally over time and/or in real time as information about attendance is collected or becomes available.

By way of example and without limitation, the collected commission percentage for an event may be reduced by 1% (or $1) every 24 hours (or after every transaction), in response to determining that 90 days prior to the event less than 20% of the tickets (e.g., seats) are sold. And/or, the collected commission percentage for the same event may be increased by 1% (or $1) every 24 hours (or after every transaction), in response to determining that 30 days prior to the event less than 20% of the tickets are outstanding or remain available.

In certain implementation, the status of a ticket holder can be predicted by determining whether the current token owner is a consumer who plans to attend the event. For example, if the token owner has converted his demand token to an admission token then it is likely that the token owner will be attending the event and does intend to resell the ticket token. Conversely, a token owner may be assumed to be a reseller, if the token owner has not converted his demand token to an admission token. Using statistical analysis, the commission values for downstream transactions may be adjusted, depending on the number of current token owners that are identified as having a consumer or reseller status.

By way of example and without limitation, if it is determined that more than 25% of the current token owners are resellers, then the commission due on the sale of a demand token may be reduced to promote further ticket sales to consumers, where the statistical analysis of the status of the token owners reflects low attendance demand for the event. Alternatively, if it is determined that less than 25% of the current token owners are resellers, then it can be assumed that there is high demand for attending the event, and the commission due on the sale of a demand token may be increased to maximize return and profit margin to the upstream sellers (e.g., the originating ticket agency, originating entity or producer).

Figure 3A:
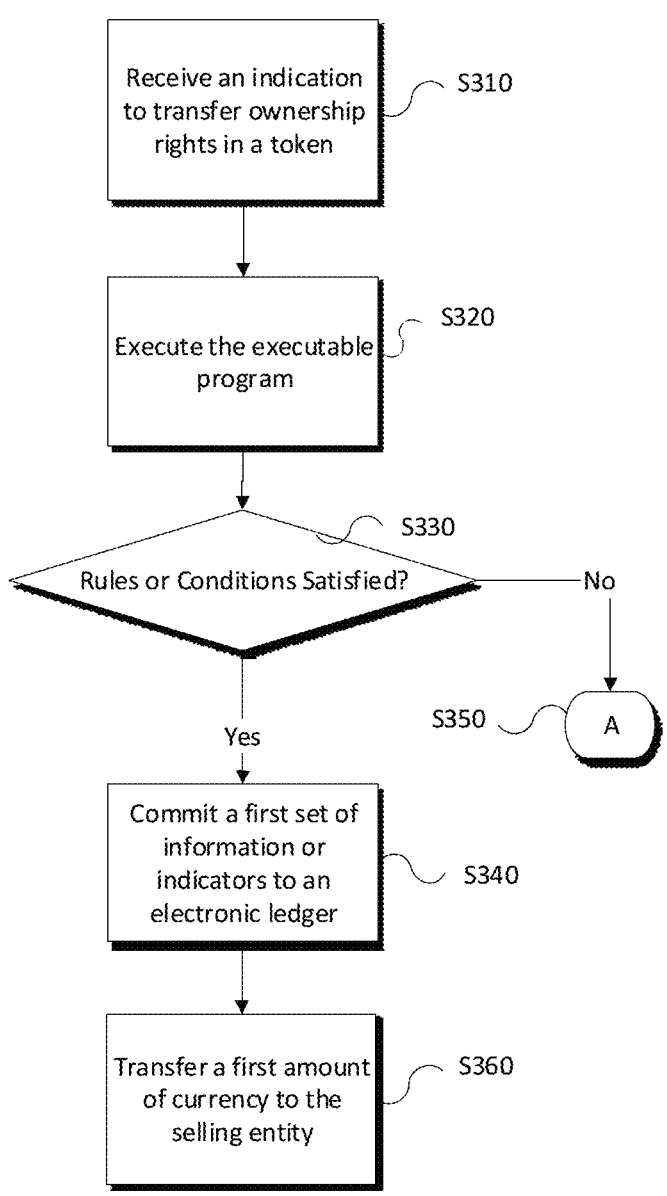
FIGS. 3A and 3B are flow diagrams illustrating other example processes for controlling downstream transactions in an electronic ledger depending on token restrictions, in accordance with one or more embodiments.

Referring to FIG. 3A, one or more nodes of an electronic ledger platform may be enabled to carry out operations that provide for seamless control over ownership rights and privileges associated with an electronic token, as the token continues to be transferred in downstream commerce between various entities. For example, consider a scenario in which a first entity (e.g., a selling entity including or other than the originating entity) wishes to transfer ownership rights of an electronic token to a second entity (e.g., a buying entity). If the token is not associated with any privileges other than, for example, the right to attend an event, then the transfer of ownership may be facilitated based on the details provided earlier above.

In accordance with one or more implementations, however, the token may be issued with certain privileges. Examples of privilege include an applicable discount, a VIP status, a backstage pass, a prize, a fully refundable token, or any other added advantage beyond the right to own or transfer the token. In certain aspect, the originator may also define categories or classes of owners that would be entitled to one or more privileges attached to a token. For example, a 10% discount may be only available to a class of owners that are college students, a 20% discount may be only available to a class of owners that are high school students, a back stage pass may be available to a class of owners that are members of a fan club or use a certain source of funds (e.g., a specifically branded credit card) to purchase the token, and so on.

Accordingly, depending on whether a token is associated with certain privileges or not, additional steps or protocols may need to be followed in order to determine if the buying entity is entitled to certain privileges. By way of example, a token at the time of issuance may be embedded with data or metadata that identify the privileges associated with the token and/or identify classes, categories, or types of entities that would be entitled to certain privileges. As shown in example process flow in FIG. 3A, an indication authorized by a selling entity to transfer ownership rights in the token to the buying entity may be submitted to and received by the electronic ledger (S310).

In one aspect, the indication includes a set of verifiable qualifications associated with the buying entity and the token includes at least one or more of a record of a first value (e.g., $100) associated with the token, a record of a set of restrictions associated with the token, and a reference to an executable program (e.g., smart contract). The restrictions may be based on rules and conditions (or references to rules and conditions) that are to be satisfied in order for the transfer of ownership for the token to be completed. In other words, if one or more rules or conditions are not satisfied, the transfer either fails or certain privileges are made unavailable to the buying entity.

Referring back to FIG. 3A, in response to execution of the executable program (S320), it is determined whether one or more of the rules or conditions are satisfied (S330). A rule or condition is deemed satisfied, for example, in response to determining that the buying entity is qualified for the ownership of the token or certain privileges based on an evaluation of the set of verifiable qualifications and restrictions.

As provided herein and above, the verification of the qualifications may be assigned to an independent entity or a verification module (e.g., an oracle) that authenticates the identity of the buying entity or the buying entity's status (e.g., membership in certain groups or classes).

Depending on the results of the verification, the smart contract determines whether the buying entity satisfies the indicated restrictions (e.g., a set of rules or conditions) and either approves, modifies, or denies the transaction. It is noteworthy that in some implementations the smart contract and the verification module may be combined such that the verification of the buying entity's qualifications and whether the restrictions (e.g., rules or conditions) are satisfied are performed by the same module. In other embodiments, two or more modules may be configured to separately verify of the qualifications of a buying entity and validate the restrictions associate with a token and relay the results to a smart contract that is executing a token transaction.

Accordingly, a smart contract may commit a first set of information or indicators to one or more records of an electronic ledger in the electronic ledger platform, if one or more of the rules and conditions are satisfied (S340). If one or more rules and conditions are not satisfied, then the transfer fails or a second set of information or indicators are committed to one or more records of the electronic ledger (S350). The information and indicators committed to the electronic ledger may, for example, memorialize onto one or more records of the electronic ledger that the transfer of the token to the buying entity is confirmed, in exchange for currency corresponding to the first value (e.g., $100). Accordingly, a first amount of currency corresponding to the first value is transferred to the selling entity (S360).

Figure 3B:
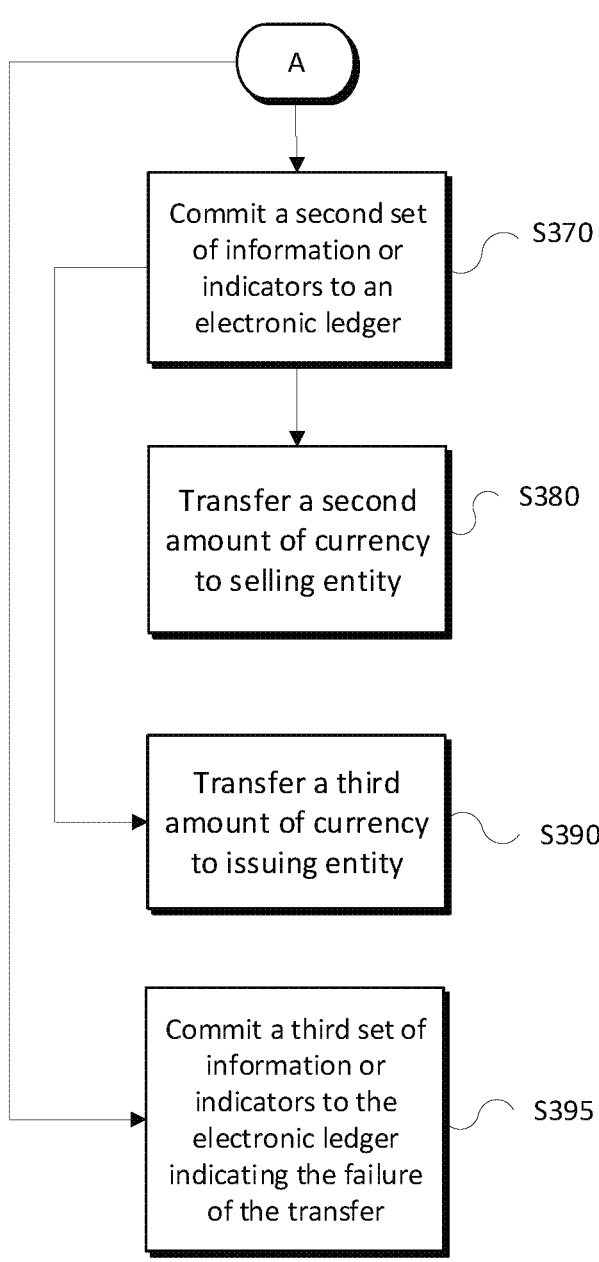

Referring to FIG. 3B, if the buying entity is not qualified for the ownership of the token based on the evaluation of the set of verifiable qualifications and the set of restrictions, the one or more rules or conditions may not be satisfied. If so, a second set of information or indicators may be committed to the electronic ledger (S370) to memorialize the same and also to indicate the token is to be transferred to the buying entity in exchange for currency corresponding to a second value (e.g., $200) higher than the first value. Accordingly, a second amount of currency corresponding to a first portion of the second value (e.g., $150) is transferred to the selling entity (S380) and a third amount of currency corresponding to a second portion of the second value (e.g., $50) is transferred to a third entity (e.g., an issuing entity) (S390).

As noted earlier, in an example scenario, an executable program (e.g., a smart contract or other executable modules) may determine that the buying entity is not qualified for the ownership of the token based on the evaluation of the set of verifiable qualifications and the set of restrictions. If so, a third set of information or indicators may be committed to the electronic ledger indicating that the transfer of the token was unsuccessful (S395). In certain embodiments, the executable program fails to write the transaction to the electronic ledger or indicates the failure or rejection of the transaction by way of committing an error code to the one or more blocks of the electronic ledger.

In accordance with one or more embodiments, a smart contract determines the value to be paid by a buying entity based on the set of restrictions associated with the token or based on the set of verifiable qualifications associated with the buying entity. For example, the set of verifiable qualifications may indicate whether the buying entity is a member of a group or otherwise identify the buying entity as being a member of a class that is entitled to one or more privileges associated with the token being transferred. As provided earlier, the buying entity may be determined as not qualified for the ownership of the token, if it is determined that a characteristic associated with the buying entity violates a restriction in the set of restrictions. For example, where a restriction is for the token to be only transferred to a student, if the buying entity is not verified as being a student, then the transfer of the token fails, or the buying entity will have to pay a higher price for the token.

As another example, the set of verifiable qualifications for a buying entity may indicate a characteristic for the buying entity that would disqualify the buying entity from utilizing a privilege associated with the ownership of the token. This may be in response to determining that the characteristic of the buying entity violates a restriction. If so, the buying entity may purchase the token at a certain value, but would not be able to take advantage of the associated privileges. For example, a token may be associated with VIP privileges if sold to a buying entity that is a member of a fan club. If the buying entity cannot be verified as a member of the fan club, then the particular privilege associated with the token will not be activated for the buying entity.

It is noteworthy that where the privilege associated with the ownership of the token is associated with access to one or more resources (e.g., an early admission, discounted parking, back-stage pass, privileged entry, privileged seat assignment, complementary consumables, etc.), the buying entity may qualify for one set of privileges and be excluded from others, depending on the verifiable characteristics associated with the buying entity as verified by a verification module. For example, the verification module may determine that the buying entity is a member of a Fan Club A who is entitled to certain privileges A1, A2 and A3 associated with the token being transferred, but that the buying entity is not entitled to privileges B1 and B2 available to a member of Fan Club B.

Accordingly, in certain implementations, privileges associated with a token may be turned on or off at the time of transfer of ownership to add or remove access to one or more privileges tied to the token at the time of issuance. In some aspects, a privilege may be added to a token even if it was not associated with the token at the time of issuance. In other aspects, a token may become non-transferable or be invalidated, in response to determining that a characteristic of the buying entity violates a restriction or fails validation.

Figure 4:
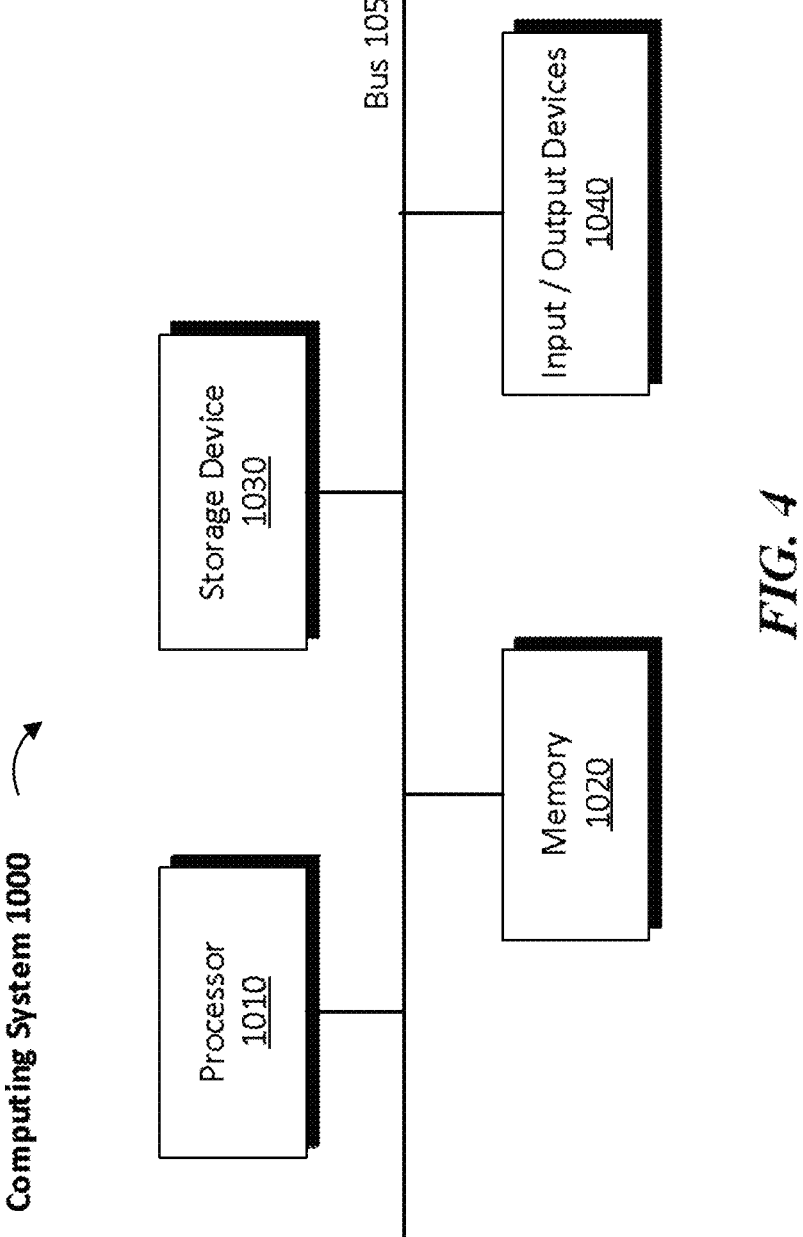
FIG. 4 is a block diagram of a computing system that may be utilized to perform one or more computer processes disclosed herein as consistent with one or more embodiments.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 3, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be generally remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method for enabling one or more nodes of an electronic ledger platform, the electronic ledger platform comprising an electronic ledger having one or more records, to carry out operations with respect to the one or more records, the operations comprising:

receiving an indication authorized by a first entity to transfer ownership rights in a cryptographic token to a second entity, the indication comprising a set of verifiable qualifications associated with the second entity, the cryptographic token comprising a record of at least a first value associated with the cryptographic token, a record of at least a set of restrictions associated with the cryptographic token, and a reference to an executable program stored in association with the electronic ledger platform;

wherein the set of verifiable qualifications comprises one or more cryptographic assertions written to the electronic ledger by a verification module implemented by one or more processors and stored in memory, the verification module operating as an oracle process that interfaces with one or more external data sources to authenticate identity information associated with the second entity, the cryptographic assertions including at least one of a cryptographic wallet identifier, a digital certificate, or a timestamped verification record;

executing the executable program referenced by the cryptographic token using one or more nodes of the electronic ledger platform;

evaluating the set of verifiable qualifications associated with the second entity against the set of restrictions associated with the cryptographic token to determine qualification status, wherein evaluating comprises using data in the cryptographic assertions written to the electronic ledger to determine whether the second entity satisfied the set of restrictions;

wherein execution of the executable program causes the one or more nodes of the electronic ledger platform to selectively commit, based on the qualification status, metadata to the one or more records of the electronic ledger;

wherein, in response to determining that the second entity is qualified for ownership of the cryptographic token, the one or more nodes of the electronic ledger platform commit the metadata to the one or more records of the electronic ledger, the metadata including a reference to a transfer of the cryptographic token to the second entity in exchange for currency corresponding to the first value; and in response to determining that the qualification status indicates the second entity is not qualified:

causing, by execution of the executable program, the one or more nodes of the electronic ledger platform to deny the transfer of ownership rights; and committing a transaction to one or more blocks of an electronic ledger in the electronic ledger platform, wherein the transaction comprises an error code indicating a rejection of the transfer of ownership rights due to the second entity failing to satisfy the set of restrictions.

2. The method of claim 1, wherein the executable program comprises a smart contract deployed on a blockchain network, and wherein executing the executable program comprises invoking the smart contract through a distributed consensus mechanism.

3. The method of claim 2, wherein the smart contract includes cryptographic validation logic configured to authenticate the set of verifiable qualifications using digital signatures and cryptographic proofs.

4. The method of claim 1, wherein the cryptographic token comprises embedded metadata that defines privilege parameters, and wherein the executable program is configured to selectively activate the privilege parameters based on the qualification status determined through the evaluation.

* * * * *